US006822609B2

(12) United States Patent
Mendolia et al.

(10) Patent No.: US 6,822,609 B2
(45) Date of Patent: Nov. 23, 2004

(54) METHOD OF MANUFACTURING ANTENNAS USING MICRO-INSERT-MOLDING TECHNIQUES

(75) Inventors: Greg S. Mendolia, Ellicott City, MD (US); Yizhen Lin, Hyattsville, MD (US)

(73) Assignee: Etenna Corporation, Laurel, MD (US)

( * ) Notice: Subject to any disclaimer, the term of this patent is extended or adjusted under 35 U.S.C. 154(b) by 156 days.

(21) Appl. No.: 10/263,142

(22) Filed: Oct. 2, 2002

(65) Prior Publication Data

US 2003/0174091 A1 Sep. 18, 2003

Related U.S. Application Data

(60) Provisional application No. 60/364,502, filed on Mar. 15, 2002.

(51) Int. Cl.[7] .............................................. H01Q 1/38
(52) U.S. Cl. ................................. 343/700 MS; 29/600
(58) Field of Search ......................... 343/700 MS, 702, 343/846; 29/600

(56) References Cited

U.S. PATENT DOCUMENTS

| | | | | |
|---|---|---|---|---|
| 5,341,149 | A | | 8/1994 | Valimaa et al. ............. 343/895 |
| 5,504,494 | A | | 4/1996 | Chatzipetros et al. ....... 343/702 |
| 5,648,788 | A | | 7/1997 | Bumsted ..................... 343/895 |
| 6,147,661 | A | | 11/2000 | Nakagawa et al. .......... 343/895 |
| 6,195,048 | B1 | | 2/2001 | Chiba et al. .......... 343/700 MS |
| 6,204,826 | B1 | | 3/2001 | Rutkowski et al. .......... 343/895 |
| 6,285,324 | B1 | * | 9/2001 | Korisch et al. ...... 343/700 MS |
| 6,307,512 | B1 | * | 10/2001 | Geeraert ....................... 343/702 |
| 6,326,921 | B1 | | 12/2001 | Egorov et al. ....... 343/700 MS |
| 6,333,716 | B1 | * | 12/2001 | Pontoppidan ................ 343/702 |
| 6,486,837 | B2 | * | 11/2002 | Spiegel et al. .............. 343/702 |
| 2003/0010529 | A1 | | 1/2003 | Sievenppiper et al. ....... 174/255 |
| 2003/0174092 | A1 | * | 9/2003 | Sullivan et al. ............. 343/702 |

OTHER PUBLICATIONS

Dou, Wei Ping et al., "Novel Meandered Planar Inverted–F Antenna for Triple–Frequency Operation," Microwave and Optical Technology Letters, vol. 27, No. 1, Oct. 5, 2000, pp. 58–60.

Fries, Matthias K., et al., "Small Microstrip Patch Antenna Using Slow–Wave Structure," 2000 IEEE APS Symposium, Salt Lake City, Utah, Jul. 16–21, 2000, pp. 770–771.

Kan, H.K., et al., "Size reduction technique for shorted patches," Electronics Letters, Jun. 10th 1999, vol. 35, No. 12, pp. 948–949.

Lui, Gabriel K.H., et al., "Compact Dual–Frequency PIFA Designs Using LC Resonators," IEEE Transactions on Antennas & Propagation, vol. 49, No. 7, Jul. 2001, pp. 1016–1019.

Liu, Zi Dong, et al, "Dual–Frequency Planar Inverted–F Antenna," IEEE Transactions on Antennas & Propagation, vol. 45, No. 10, Oct. 1997, pp. 1451–1458.

Guo, Yong–Xin, et al., "A Quarter–Wave U–Shaped Patch Antenna with Two Unequal Arms for Wideband and Dual-Frequency Operation," IEEE APS Intl. Symp., Boston, MA, Jul. 8–13, 2001,pp. 54–89.

Salonen, Pekka, et al., "Dual–Band and Wide–Band PIFA with U– and Meanderline–Shaped Slots," IEEE APS Intl. Symp., Boston, MA, Jul. 8–13, 2001, pp. 116–119.

(List continued on next page.)

*Primary Examiner*—Tan Ho
(74) *Attorney, Agent, or Firm*—Brinks Hofer Gilson & Lione (57) ABSTRACT

An antenna includes a precision micro-molded plastic spacer and a metal insert. The plastic spacer is configured for mounting to a printed circuit board (PCB) to maintain the metal insert a predetermined distance from a ground plane. Micro-insert-molding techniques produce tight mechanical dimensions including those which define the antenna height, ensuring reliable and consistent antenna electrical performance.

18 Claims, 6 Drawing Sheets

OTHER PUBLICATIONS

Warnagiris, Thomas J., et al., "Performance of a Meander Line as an Electrically Small Transmitting Antenna," IEEE Transactions on Antennas & Propagation, vol. 46, No. 12, Dec. 1998, pp. 1797–1801.

Waterhouse, R.B., et al., "Novel Techniques to Improve the Manufacturing Ease of Shorted Patches," Microwave and Optical Technology Letters, vol. 17, No. 1, Jan. 1998, pp. 37–40.

* cited by examiner

| Index | Dimension | Index | Dimension |
|---|---|---|---|
| $A_0$ | 10.50 ± 0.10 mm | E | 1.75 ± 0.10 mm |
| $B_0$ | 14.50 ± 0.10 mm | F | 11.50 ± 0.1 mm |
| ⌀D | 1.55 ± 0.05 mm | $P_0$ | 4.00 ± 0.1 mm |
| $K_0$ | 3 ± 0.10 mm | P | 16.00 ± 0.1 mm |
| W | 24.0 ± 0.30 mm | $P_2$ | 2.00 ± 0.1 mm |
| $A_0$ | 10.50 ± 0.10 mm | E | 1.75 ± 0.10 mm |
| $B_0$ | 14.50 ± 0.10 mm | F | 11.50 ± 0.1 mm |
| ⌀D | 1.55 ± 0.05 mm | $P_0$ | 4.00 ± 0.1 mm |
| $K_0$ | 3 ± 0.10 mm | P | 16.00 ± 0.1 mm |
| W | 24.0 ± 0.30 mm | $P_2$ | 2.00 ± 0.1 mm |

METHOD OF MANUFACTURING ANTENNAS USING MICRO-INSERT-MOLDING TECHNIQUES

RELATED APPLICATIONS

This application is related to U.S. provisional application Ser. No. 60/364,502 entitled "Method For Fabrication of Miniature Lightweight Antennas," filed Mar. 15, 2002 in the names of Greg S. Mendolia, William E. McKinzie III and John Dutton and commonly assigned to the assignee of the present application, and U.S. application Ser. No. 10/211,731 entitled "Miniature Reverse-Fed Planar Inverted F Antenna," filed Aug. 2, 2002 in the names of Greg S. Mendolia, John Dutton and William E. McKinzie III and commonly assigned to the assignee of the present application, all of which related applications are incorporated herein in their entirety by this reference.

BACKGROUND

The present invention relates generally to antenna designs and manufacturing. More particularly, the present invention relates to a method of manufacturing antennas using micro-insert-molding techniques, and antennas manufactured using such techniques.

Antennas for portable wireless devices include both internal and external types. Portable wireless devices include cellular telephones, cordless telephones, and personal digital assistants (PDAs). Further, with the advent of wireless data communication standards such as Bluetooth and IEEE standard 802.11, portable wireless devices include any sort of portable data processing or communication device. In many of these portable wireless devices, antennas are mounted externally and include, for example, extendable whip antennas. In an increasing number of portable wireless designs, however, internal antennas are favored for their reduced size, cost and weight, as well as providing a more attractive appearance to the portable product since the entire antenna is hidden from external view.

There are various realizations of internal antennas for portable devices, but the cost and size of these approaches often limits the industrial design of the product or compromises total cost. Antennas can be fabricated using metal, fiberglass (FR4) printed circuit board (PCB) material, foam combined with flex circuits, and a multitude of other common variations.

Antennas radiate at frequencies which are dependant on their geometry, their height above the ground plane, and the dielectric constant of the materials that they are made of. Of these defining features, height above the ground plane has the greatest affect on frequency of operation. Height is also the most difficult physical feature to maintain at tight tolerances. Length and width, as well as other features on the aperture of the antenna are very reproducible. These dimensions are in the plane of the antenna and can be defined accurately using standard lithographic or stamping processes. But due to the three dimensional nature of the end product, the antenna's height is far less controllable.

Figure 1:
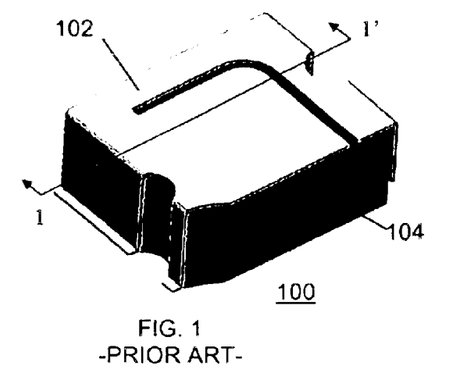
FIG. 1 is an isometric view of a prior art surface mount antenna assembly.
Figure 2:
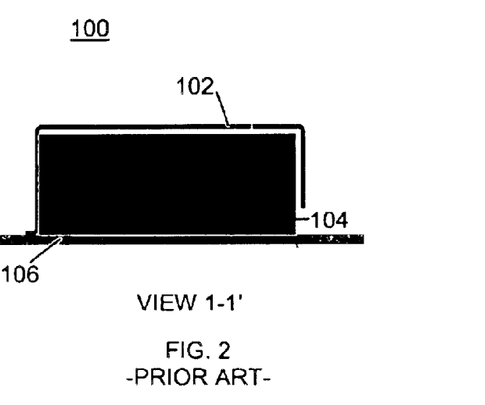
FIG. 2 is a cross-sectional view of the antenna assembly of FIG. 1 taken along line 1-1'.

Current fabrication techniques to construct antennas typically stack various sub-components. The most common construction is illustrated in FIG. 1, which shows a prior art surface mount antenna assembly 100. FIG. 2 is a cross-sectional view of the antenna assembly 100 taken along line 1—1'. The antenna assembly 100 includes a sheet metal antenna 102 and a plastic support 104 mounted on a ground plane 106. Construction of the antenna assembly 100 requires bending the sheet metal 102 into the desired antenna shape, and draping the antenna sheet metal 102 over the plastic stand-off or support 104, as shown in FIGS. 1 and 2. This induces significant variability in the height of the antenna. Also, even if the antenna is fabricated perfectly, the final height realized in the customer's product is susceptible to variation due to assembly tolerances. This is especially true for antennas that are not surface mountable using standard surface mount technology (SMT) processes. Antennas that have to be soldered on to a printed circuit board (PCB) by hand, or rely on spring contacts, can see height variations approaching 10%.

Manufacturers of wireless devices such as handsets, PDA's and laptops are constantly pressured to reduce the size and cost of their products. Existing antenna solutions require significant space, add weight, increase cost, and most importantly, often compromise production yields. The frequency of operation and performance of an antenna is very dependant on the antenna's physical dimensions, especially the height between the radiating element and the ground plane. Hence, one of the major cost drivers when fabricating high-volume antennas is reproducibility of the antennas themselves.

Accordingly, there is a need for an improved antenna and method for manufacturing antennas that meets these requirements.

BRIEF SUMMARY

By way of introduction only, the present invention may be applied in any of a variety of embodiments. In accordance with one embodiment, an antenna includes a molded plastic spacer and a metal insert. The plastic spacer is configured for mounting to a printed circuit board (PCB) to keep the metal insert a predetermined distance from a ground plane.

In a second embodiment, an antenna includes an injection molded plastic insert which has a body and a mounting portion extending from the body. The plastic insert is configured for surface mount engagement with a PCB to maintain the body a predetermined distance from a ground plane of the PCB. The antenna further includes a metal insert including a radiating portion molded with the body of the plastic insert and a ground lead and feed extending along the mounting portion of the plastic insert for electrical engagement with the PCB.

In another embodiment, an antenna tape and reel package includes plurality of antennas. Each antenna is formed by injection molding one metal insert of a tape of substantially identical metal inserts in a plastic insert. The plastic insert is sized to position the metal insert a predetermined distance from a ground plane when the antenna is assembled with a PCB. The antenna tape and reel package further includes indexing apparatus for moving the plurality of antennas through an automated printed circuit board assembly system.

In still another embodiment, an antenna manufacturing method includes positioning a metal insert in a mold cavity and filling the mold cavity with plastic to form a plastic spacer. The plastic spacer is shaped to position the metal insert a predetermined distance from a ground plane of a PCB when the plastic spacer is mounted to the PCB.

The foregoing summary has been provided only by way of introduction. Nothing in this section should be taken as a limitation on the following claims, which define the scope of the invention.

DETAILED DESCRIPTION OF THE PRESENTLY PREFERRED EMBODIMENTS

The proposed antenna departs from the antenna shown in FIGS. 1 and 2 by using micro-insert molding techniques to manufacture the antenna with much more control on mechanical tolerances and significantly lower total cost. The techniques disclosed here in may be applied to the widest variety of antennas and they have particular application to surface mount antennas to be mounted directly to the surface of a printed circuit board. The main printed circuit board (PCB) of the product forms the ground plane for the antenna. Many types of antennas can be mounted above a ground plane. Bent-wire monopoles, dipoles, patches, shorted patches, and Planar Inverted F Antennas (PIFA) are all examples of antenna types compatible with mounting above a finite size ground plane.

Figure 3:
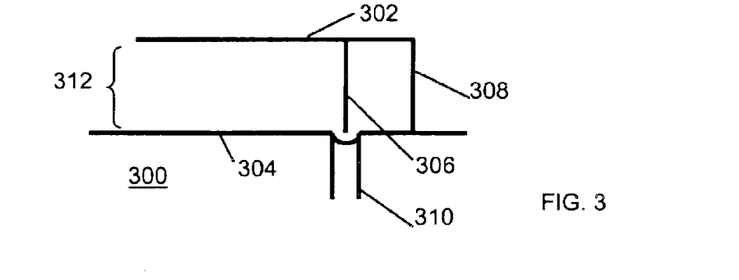
FIG. 3 is a cross sectional view of a standard planar inverted F antenna.

One particular type of antenna which may benefit from the disclosed method and apparatus is a planar inverted F antenna or PIFA. FIG. 3 shows a cross sectional view of a PIFA 300. The PIFA 300 includes an antenna 300, a ground plane 304, an aperture 302, a feed 306 and a ground return 308. The feed 306 and ground return 308 are electrically coupled with a coaxial cable 310.

A further example of an antenna which may be used in conjunction with the method and apparatus disclosed herein is a reverse-fed planar inverted F antenna (RFPIFA), of the type disclosed in U.S. application Ser. No. 10/211,731 entitled "Miniature Reverse-Fed Planar Inverted F Antenna," filed Aug. 2, 2002 in the names of Greg S. Mendolia, John Dutton and William E. McKinzie III and commonly assigned to the assignee of the present application, which is incorporated herein in its entirety.

Many physical or mechanical parameters define the electrical performance of an antenna, including the PIFA 300. One key mechanical parameter is the antenna height 312, or the space between the antenna aperture 302 and the ground plane 304. The performance of the PIFA 300 is strongly dependent on accurate positioning of the antenna aperture 302 above the ground plane 304.

Antennas fabricated as shown in FIGS. 1 and 2 are difficult to maintain tight mechanical tolerances. For example, a 2.4 GHz antenna measuring only 2.5 mm high must maintain a height tolerance of as little as only +−1.0 mils (0.025 mm), depending on desired bandwidth and match. This is next to impossible using current manufacturing approaches commonly applied to antennas. As a result, antennas need to be 100% tested when they are manufactured. This adds cost due the additional cost of test capital, test labor, and yield loss. Antenna performance is also degraded since the statistical distribution of center frequency and optimum performance may not be centered to the specification required. This means that a finite percentage of the antennas made using existing practices will perform sub-optimally because peak performance is not in band.

In addition to performance requirements, the challenge for most internal antennas used in portable wireless electronics is to minimize device size while keeping cost and performance at acceptable levels. This size constraint limits the electrical bandwidth of internal antennas, often to a point barely adequate to cover the frequency band of interest. Therefore, any variation of an antenna's frequency response caused by unit-to-unit variation will result in a shift in performance upwards or downwards in frequency. This frequency shift results in antenna performance that is not centered in the desired band, and hence a failure to meet specification will cause the part to be rejected. The greater the unit-to-unit variation, the more antennas will not meet specification, and the greater the yield loss. This situation also forces 100% of the antennas to be electrically tested at the manufacturing site.

Figure 4:
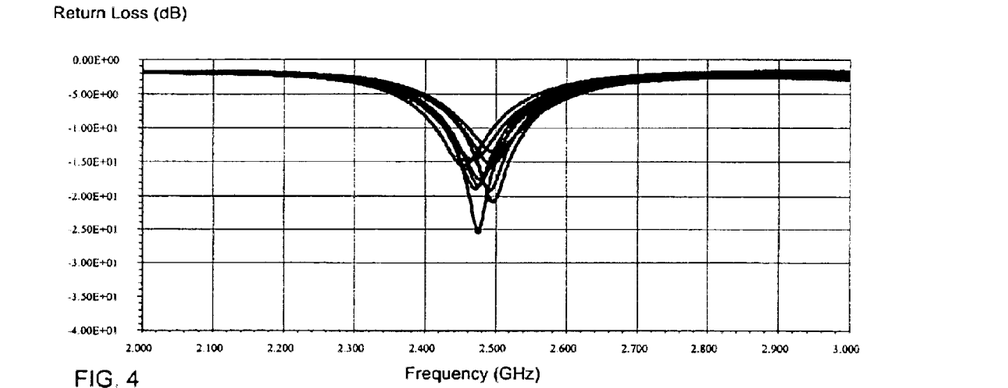
FIG. 4 illustrates return loss plots for conventional antennas.

FIG. 4 illustrates this frequency shift among ten test antennas. In FIG. 4, test frequency is plotted on the abscissa and antenna return loss is plotted on the ordinate. The ten antennas were hand-assembled antennas intended for Bluetooth applications at 2.4 GHz with a flexible circuit attached to a foam core support and assembled to a test PCB using a surface mount reflow process. As can be seen in FIG. 4, there is substantial variation in the peak return loss over a range from 2450 to 2500 MHz. At least some of these test antennas would be rejected for failure to meet specifications. Moreover, because of the illustrated variability in antenna performance, each antenna must be electrically tested before sale and shipment to a customer.

Figure 5:
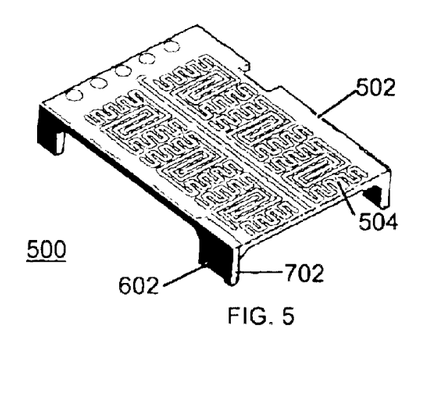
FIG. 5 is a first isometric view of an antenna.
Figure 6:
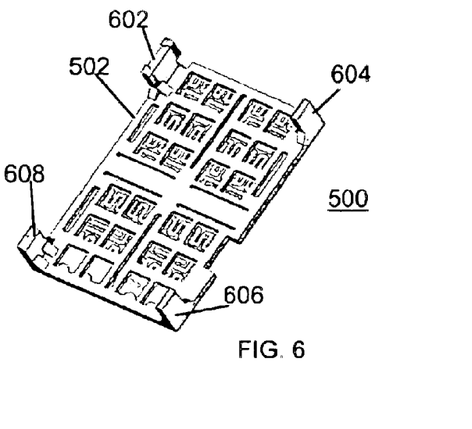
FIG. 6 is a second isometric view of the antenna of FIG. 5.
Figure 7:
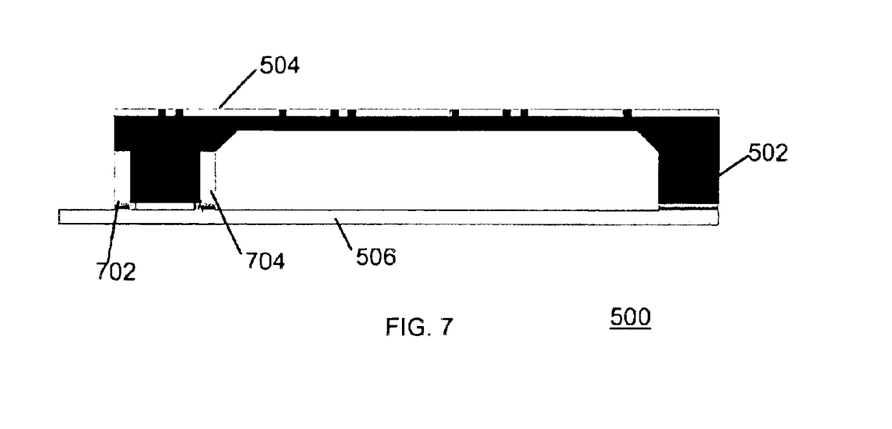
FIG. 7 is a cross-sectional view of the antenna of FIG. 5.

One embodiment for fabrication of an antenna using this method is shown in FIGS. 5, 6 and 7. FIG. 5 is a first isometric view of an antenna 500. FIG. 6 is a second isometric view of the antenna 500 of FIG. 5. FIG. 7 is a cross-sectional view of the antenna 500 of FIG. 5. As can be seen in the figure, the metal of the antenna is captured in plastic during an insert molding process. The particular antenna shown is a reverse-fed DCL-FSS antenna of the type described in the incorporated patent application.

The antenna 500 includes a molded plastic spacer 502 and a metal insert 504. The plastic spacer 502 is configured for mounting to a printed circuit board (PCB) 506 to maintain the metal insert 504 a predetermined distance from a ground plane, such as a ground plane of the PCB 506. The antenna 500 is fabricated by joining the metal insert 504 and the plastic spacer 502 in a micro-injection-molding process, as well be described in greater detail below in conjunction with FIGS. 8, 9 and 10.

As can be seen in FIGS. 6 and 7, in this exemplary embodiment, the plastic spacer 502 is table-top shaped with a plurality of legs 602, 604, 606, 608 configured for PCB mounting. The antenna 500 includes a ground lead 704 and a feed 702 extending on one or more legs of the plurality of legs and configured for electrically connecting the metal insert with the printed circuit board. In the illustrated embodiment, the ground lead 704 and the feed 702 extend along the length of one leg 602. In other embodiments, these conductors may be separated or multiple ground leads or multiple feeds may be substituted. In non-PIFA applications, the required electrical connections may dictate a different mechanical connection.

The metal insert 504 is formed by patterning a metal conductor to the required antenna design. The metal insert 504 is a generally planar, unitary, conductive device. In one embodiment, the metal insert is fabricated from copper plated with a common finish such as nickel, tin or gold. In other embodiments, other conductive components, even non-metallic conductors or dielectric components, may be substituted for all or part of the metal insert 504.

Patterning in one embodiment is accomplished by etching, cutting or stamping the metal conductor. Etching may be achieved by, for example, a chemical photolithographic process. Devices and processes for patterning the metal insert 504 are well known or may be readily adapted to particular requirements.

In other embodiments, the metal insert 504 may be formed from a plurality of metal or other components, in substitution for the unitary embodiment shown for example in FIG. 5. Moreover, while the exemplary embodiment is rectilinear and substantially planar, other shapes may be chosen, with variation in all planes. It will be understood by those ordinarily skilled in the art of antenna design that a wide variety of shapes and materials may be chosen to satisfy particular design, performance and manufacturing goals. The metal insert 504 is exemplary only.

Figure 8:
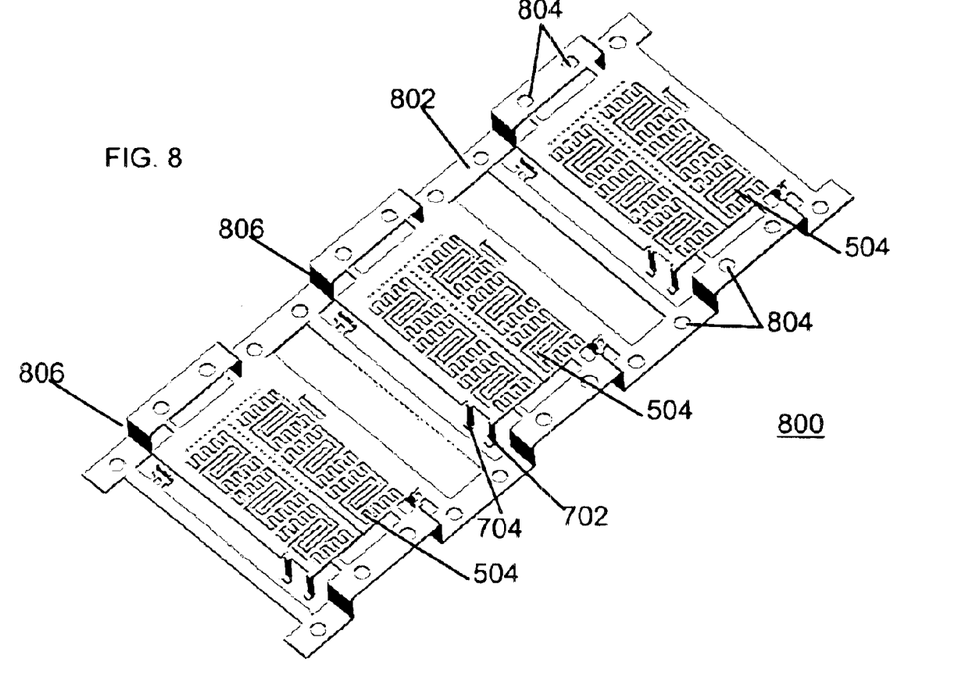
FIG. 8 illustrates a portion of a tape of metal inserts on a continuous metal indexed reel.

FIG. 8 illustrates a portion of a tape 800 of metal inserts 504 on a continuous metal indexed reel. FIG. 8 illustrates one embodiment by which antennas such as the antenna 500 may be manufactured in large quantities with mechanical precision. The tape 800 including the metal inserts 504 may be formed as a continuous strip and mounted on a reel for manufacturing of completed antennas 500 (FIG. 5) in conjunction with an insert molding machine. The tape 800 includes the inserts 504 mounted in a lead frame 802. The lead frame keeps the inserts 504 spaced a predetermined distance apart and keeps the inserts 504 properly aligned for automated manufacturing.

The lead frame 802 include indexing holes 804 which may be engage by a drive mechanism of the insert molding machine to feed the tape 800 including the metal inserts 504. The lead frame 802 of FIG. 8 includes indexing holes 804 in both sides of the tape 800. This can reduce twisting of the tape an increasing accuracy of positioning of the tape. However, in other embodiments, the number, pitch and spacing of the indexing holes 804 may be varied according to particular requirements.

The tape 800 is regularly bent at portions 806. This forms the bent feed 702 and ground lead 704 prior to molding the completed antenna 500. In other embodiments, electrical contact may be made to the metal insert 504 in a different manner.

Figure 9:
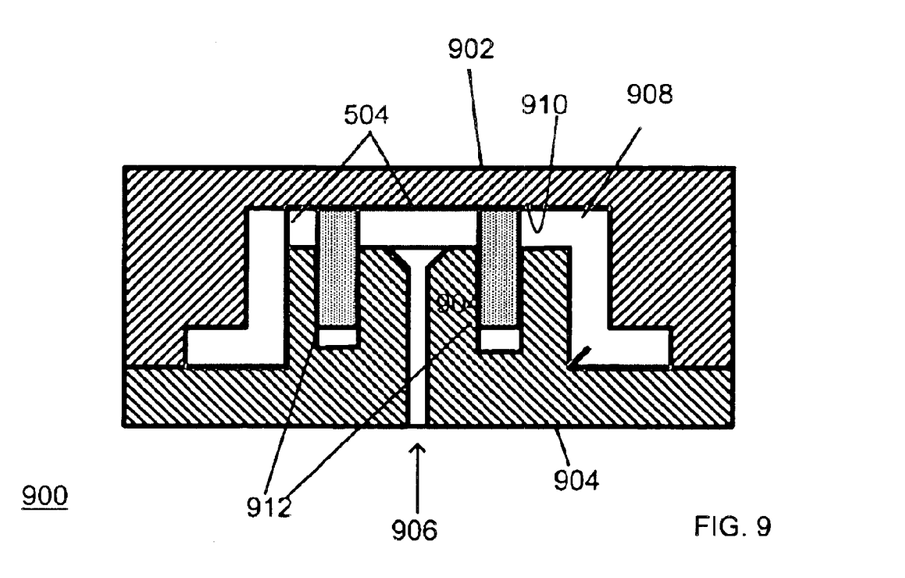
FIG. 9 is a cross-sectional view of a metal insert in a metal mold tool for plastic injection.

FIG. 9 is a cross-sectional view of a metal insert 504 in a metal mold tool 900 for plastic injection molding to produce an antenna such as the antenna 500. The mold tool 900 includes a mold cavity 902 and a mold core 904. These components are typically designed to define the predetermined shape and size of the plastic insert formed by the mold tool 900. The mold core 904 includes an inlet 906 in which molten plastic 908 is introduced to the cavity at appropriate temperature and pressure. Techniques for injection molding devices of the sizes, geometries and composition described herein are well known to those ordinarily skilled in the art of injection molding.

In embodiments in which a tape of metal inserts, such as the tape 800 of FIG. 8, is used, the tape of inserts is fed into a plastic molding machine such as the mold tool 900. To improve throughput, the plastic mold often uses a multiple cavity tool. Eight cavities is common for this size part. The metal insert 504 is held rigidly in place against the flat surface 910 of the mold cavity 902 as shown in FIG. 9. This makes it much easier to maintain a flat and true surface on the metal insert 504 as the molten plastic 908 is injected around the insert and fills the cavity 902. Temporary pins 912 may be used to pinch the metal insert 504 in place and insure that it is flat and does not move during the injection process. In alternative embodiments, where the insert 504 is to have a shape other than planar, the mold core 904 and pins 912 may be used to define and retain the final share while the molten plastic 908 fills the cavity and cures. The resulting dimensions for antenna height when using this process have been measured to have a variation of less than +/−1.0 mils from unit to unit.

The material used in one embodiment was Liquid Crystal Polymer (LCP) for the molded plastic 908, and plated copper for the insert metal 504. The LCP can withstand high temperatures, and is compatible with standard Surface Mount Technologies (SMT) for assembling these antennas on the main printed circuit board. The SMT process simply places solder paste on mounting pads within the PCB, places components such as the antenna on these pads, runs the assembly through a sequential oven with a pre-defined temperature, melting the solder and creating a permanent, reliable electrical connection and mechanical mount between the antenna and the PCB.

Once plastic is injected into the mold, the mold is opened and the tape 800 including the metal insert 504 is indexed forward by one position. If the mold tool 900 processes only a single antenna, the tape advances by a single insert. In the embodiment where the mold tool 900 processes eight antennas, the tape advances by eight inserts so that a fresh metal insert is placed into each cavity of the mold tool 900.

The next step in the manufacturing process is to separate the individual antennas by cutting through the insert and releasing the part from the metal index reel or tape 800. Other standard process steps such as visual inspection, electrical test, and packaging for shipment, may be part of the manufacturing process, but are not illustrated in the drawing. The nature and content of these test operations are well know to those ordinarily skilled in the art of test engineering, or can be developed by ready extension of conventional test techniques.

Figure 10:
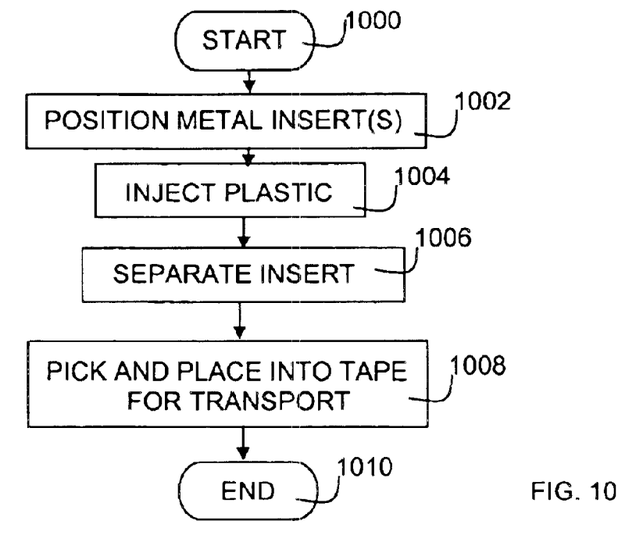
FIG. 10 is a flow diagram illustrating an antenna manufacturing method.

FIG. 10 is a flow diagram illustrating one embodiment of an antenna manufacturing method. The method begins at block 1000. At block 1002, a metal insert is positioned in the mold cavity. This may involve manual placement of a metal insert in the cavity, or the process may be automated, for example, using inserts arranged in a tape such as the tape 800 of FIG. 8. Further, this may involve operating on a single metal insert per step, or may involve operating on a plurality of metal inserts such as eight inserts placed in eight mold cavities.

At block 1004, molten plastic is injected into the mold, filling the mold cavity. As noted, in one embodiment, liquid crystal polymer is suitable for embodiments in which the completed antenna is to be surface mount assembled with a PCB using conventional surface mount techniques and temperatures. Other materials, including other plastics, may be substituted, particularly where other thermal, mechanical and electrical properties are required for the completed antenna. The molten plastic is allowed to cool and harden, forming a plastic insert, for further processing.

At block 1006, the completed antenna is singulated or separated from other completed antennas. The metal leadframe connecting the individual metal inserts is clipped to separate the completed antennas. Excess metal and plastic are trimmed.

At block 1008, in one embodiment, the completed antennas are pick-and-place assembled with a surface mount tape and reel package, as will be described in greater detail below. In other embodiments, the completed antennas are otherwise packed for storage or shipment to customers. The method ends at block 1010.

Figure 11:
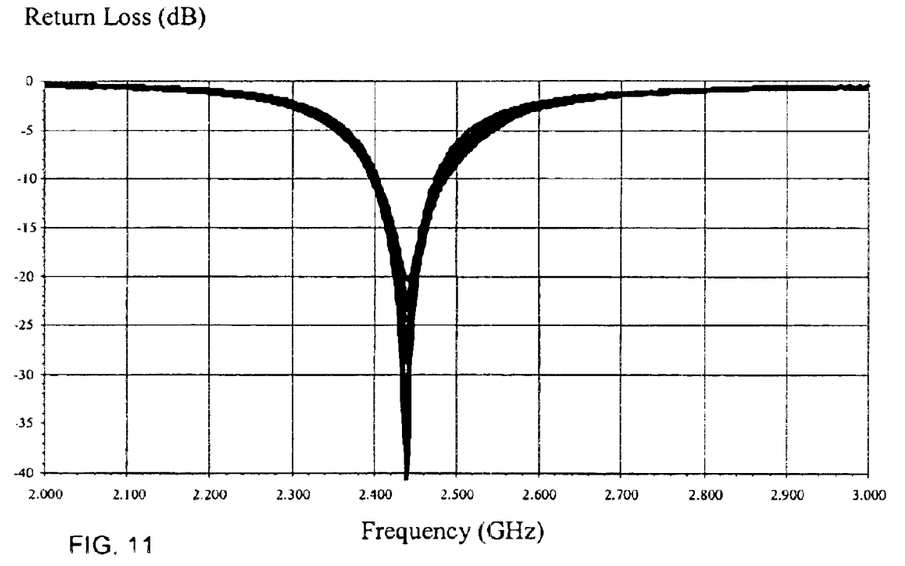
FIG. 11 illustrates return loss plots for antennas of the type show in FIGS. 3 and 4.

Initial results using this process to manufacture antennas have such a tight statistical distribution that that 100% electrical testing will not be required, saving labor and production test equipment cost, and dramatically reducing final antenna costs by having a high yield approach. The tight distribution of performance is very clear from the plots in FIG. 11. FIG. 11 plots the return loss of ten antennas developed for use according to the Bluetooth data communication standard and made using micro-insert molding in accordance with the disclosure herein. As can be seen comparing return loss with the micro-molded antenna with return loss for the conventional antenna as shown in FIG. 4, the distribution of antenna frequency response is much tighter.

The primary feature of the antenna disclosed herein that determines electrical performance and repeatability is the metal insert. The plastic insert or plastic spacer functions primarily to hold the metal insert in place to exacting dimensions. It has been found that, for most antenna types, performance is slightly reduced with increased plastic material in the plastic spacer. Therefore, improved or alternative antenna designs minimize the use of plastic and have only enough plastic present in the design to insure mechanical rigidity. Accordingly, the plastic spacer 502 of the antenna 500 shown in FIGS. 5–8 has a ribbed pattern on the reverse side, away from the surface with the metal insert 504 on the front side. This operates to minimize the volume of plastic needed. This is also why a table top form factor has been chosen in this embodiment. The antenna 500 has a body forming a table top and four table legs 602, 604, 606, 608. This table tope shape is able to suspend the antenna at a repeatable height above the ground plane as shown in the cross section of FIG. 7.

Figure 12A:
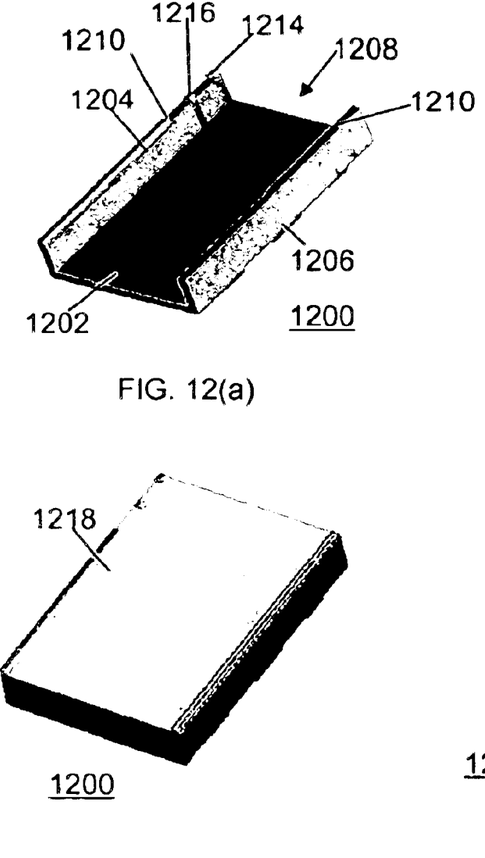
FIG. 12 illustrates alternative antenna embodiments of an antenna.
Figure 12B:
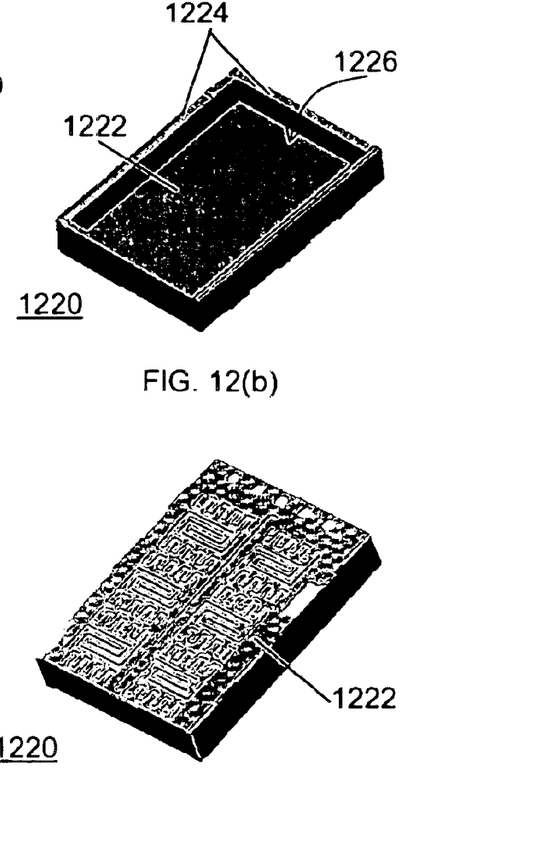

FIG. 12 illustrates alternative embodiments of an antenna. Although the table top form factor shown in FIG. 5 has particular benefits, other shapes may be substituted. For example, the plastic can be molded to create a 2-walled channel. This is illustrated by in FIG. 12(a), which shows the reverse and front sides of an antenna 1200. Further, the plastic can be molded to create an inverted box. This is shown in FIG. 12(b), which shows the reverse and front sides of an antenna 1220. Still further, the plastic can be molded to create a solid cube. Other examples may be readily substituted to fulfill particular performance, manufacturing and cost goals.

In general, the antenna plastic spacer includes a body and a mounting portion extending from the body. In FIG. 5, the mounting portion includes the four legs 602, 604, 606, 608.

In FIG. 12(a), the antenna 1200 includes a body 1202 and a mounting portion including a first wall 1204 and a second wall 1206. The walls define a cavity portion or channel 1208. Each of the walls terminates in a flat mounting surface 1210. The mounting surface is sized for surface mount connection to a PCB. The feed 1214 and the ground lead 1216 for the antenna 1200 extend from the front side to the mounting surface 1210 on the first wall 1204.

Similarly, in FIG. 12(b), the antenna 1220 includes a body 1222 and a mounting portion including an extended rim 1224. The extended rim 1224 defines a cavity portion 1226. Other geometries may readily be developed by extending and adapting these examples.

The most common type of plastic to use for all of these antennas is Liquid Crystal Polymer. (LCP) LCP can withstand the oven temperatures needed when these antennas are assembled onto circuit boards using standard Surface Mount Technologies or processes (SMT). During a SMT operation, components such as integrated circuits, chip resistors, modules and antennas are automatically machine-placed on the surface of a PCB after a solder paste has been applied to portions of the surface. The components are placed in the solder paste, and then heat is applied to reflow the solder and form a reliable mechanical and electrical connection. Because of the high heat involved, the components including the injection molded antenna must have adequate thermal properties. LCP is a material adaptable to surface mount manufacturing temperatures. Other materials may be substituted to fulfill particular design and manufacturing requirements.

Figure 13:
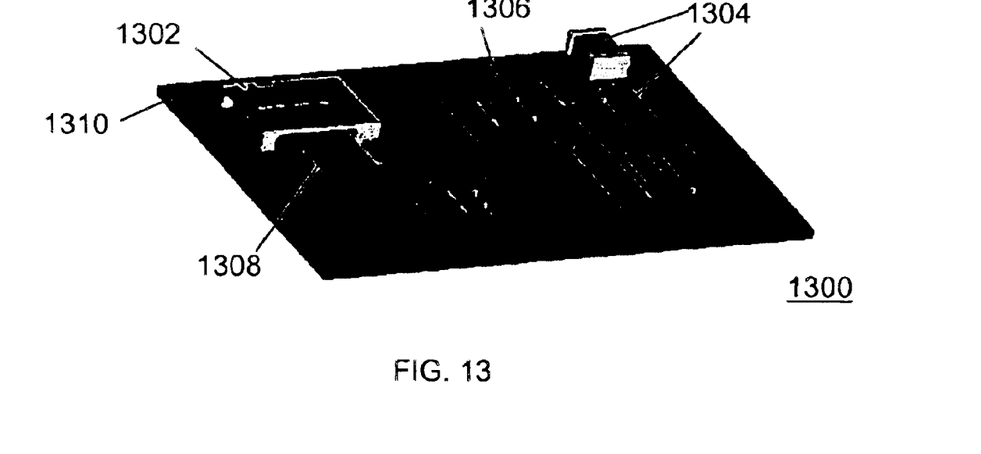
FIG. 13 is an isometric view of a printed circuit board including a surface mounted antenna.

FIG. 13 is an isometric view of a printed circuit board 1300 including a surface mounted antenna 1302. The PCB 1300 has had other components 1304 mounted thereto. Metal traces 1306 have been etched or otherwise defined on the surface to form electrical connections among the components 1304 including the antenna 1302. The printed circuit board 1300 is processed according to conventional PCB manufacturing techniques, including surface mounting of the antenna 1302. The PCB 1300 has components on only a single side, visible in the drawing figure. However, the concepts disclosed herein can be readily extended to dual-sided surface mount PCB boards which provide even higher device density.

The surface mounted antenna 1302 in this embodiment is an injection molded antenna including a metal insert molded in LCP or other suitable plastic. The antenna 1302 is similar in construction to the antenna 500 of FIGS. 5–7. The antenna 1302 uses four plastic legs to support the structure. The legs have metalized contacts which are positioned on the printed circuit board 1300 for solder reflow connection.

This form factor permits the antenna to straddle components 1308 on the board 1300 as shown in FIG. 13. Moreover, this form factor makes antennas of the type shown in the drawing particularly well suited for applications with densely populated PCBs. The antenna electrical characteristics are ideal for products operating according to the Bluetooth and IEEE 802.11 b/g standards, particularly since these antennas are often used in environments ranging from very small ground planes, such as the size of a thumbnail for products such as wireless hands-free kits to relatively large ground planes for applications such as printers or laptop computers. Also, the illustrated form factor maintains a very low profile for demanding portable Bluetooth devices with severe restriction on total height.

In some embodiments, the actual location of the antenna 1302 on the PCB 1300 impacts performance more than ground plane size. In general, in these applications, the corners are the best mounting location for the antenna. The feed pad can be either outbound or inbound from the board edge. Thus, in the embodiment of FIG. 14, the antenna 1302 is mounted near a corner 1310 of the PCB 1300. In one test embodiment, movement of the antenna to the sides of the board, away from the corner, results in a 2 to 3 dB loss in efficiency.

Figure 14:
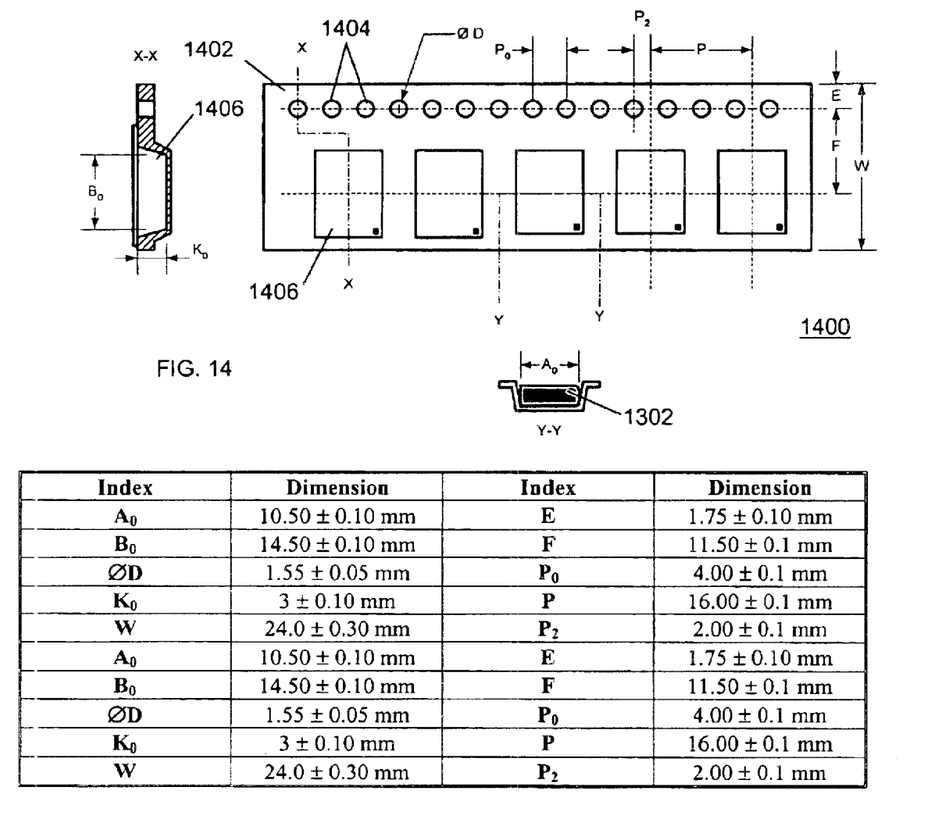
FIG. 14 illustrates a portion of an antenna tape and reel package.

FIG. 14 illustrates a portion of an antenna tape and reel package 1400. The associated table lists geometrical dimensions for one exemplary embodiment. In this embodiment, the antenna is packed in surface mount tape and reel package according to Electronic Industry Association (EIA) 481-2. The package 1400 includes a tape 1402 with indexing holes 1404. The package 1400 further includes cavities 1406 sized to carry completed antennas of the type described herein. The width and pitch of the carrier tape 1402 in this example is 24 mm×16 mm. The tape 1402 may be fed to an automatic pick and place machine for populating a printed circuit board such as the PCB 1300 of FIG. 13. Other antenna storage and transport devices may be developed as well.

From the foregoing, it can be see that the disclosed embodiments provide an improved antenna and manufacturing method therefor. A metal insert is injection molded with a plastic spacer so that, when the completed antenna is installed, the metal antenna is maintained a precise distance from the ground plane. The combination of SMT assembly and a molded antenna allows precise control of antenna height above the ground plane. This dimension is the single most critical feature for most antennas, determining final frequency of operation and overall performance. By fabricating the antenna's dimensions precisely in a mold, unit to unit variation is minimized. The use of minimal plastics also helps with minimizing statistical spread. All plastics have a characteristic dielectric constant associated with the raw material. The antenna may be designed with, for example, a table top shape so that, when assembled, the antenna has mostly air between the metal insert and ground plane. Because the ratio of volume of plastic to volume of air is low (~20%), the effect of the plastic dielectric material and any variations caused by fluctuations in its dielectric is reduced substantially.

All of the antenna examples shown illustrate the fabrication of individual antennas in plastic. Alternatively, two or more internal antennas can be fabricated in the same injection molded part. These multiple antennas in one part can be identical antennas or antennas of different design type or frequency of operation. They can serve to cover multiple frequency bands and protocols, provide diversity gain, or multiple-input-multiple-output (MIMO) capabilities. Virtually all antenna types can be fabricated using this approach, including planar antennas, PIFA antennas, bent-wire or meander monopoles or dipole.

While a particular embodiment of the present invention has been shown and described, modifications may be made. It is therefore intended in the appended claims to cover such changes and modifications which follow in the true spirit and scope of the invention.

What is claimed is:

1. An antenna comprising a molded plastic spacer and a metal insert fabricated using micro-insert molding processes, the plastic spacer being table-top shaped with a plurality of legs configured for mounting to a printed circuit board (PCB) to maintain the metal insert a predetermined distance from a ground plane, the antenna further comprising a ground lead and a feed extending on one or more legs of the plurality of legs and configured for electrically connecting the metal insert with the PCB.

2. The antenna of claim 1 wherein the plastic spacer comprises a mounting portion for mechanical engagement with the PCB and wherein the metal insert includes the ground lead and the feed extending along the mounting portion for electrical engagement with the PCB.

3. The antenna of claim 1 wherein the plastic spacer includes a first side molded with the metal insert and a second side including a mounting portion for engagement with the PCB.

4. The antenna of claim 3 wherein the second side of the plastic spacer is molded to define one or more cavities.

5. The antenna of claim 4 wherein the mounting portion comprises the plurality of legs extending from the second side, each leg of the plurality of legs terminating in a surface mountable portion for mechanical engagement with the PCB.

6. The antenna of claim 4 wherein the mounting portion comprises one or more perimeter walls defining a central cavity.

7. An antenna comprising:
an injection molded plastic insert including a body and a mounting portion extending from the body and configured for surface mount engagement with a printed circuit board (PCB) to maintain the body a predetermined distance from a ground plane of the PCB; and
a metal insert including a radiating portion molded with the body of the plastic insert and a ground lead and feed extending along the mounting portion of the plastic insert for electrical engagement with the PCB.

8. The antenna of claim 7 wherein the mounting portion comprises two or more legs extending from one side of the body and, with the body, defining a cavity region.

9. The antenna of claim 7 wherein the metal insert comprises a patterned, planar radiator and a ground lead and a feed extending from the radiator.

10. The antenna of claim 9 wherein the metal insert further comprises a removable lead frame portion.

11. The antenna of claim 10 wherein the metal insert comprises one insert of a reel of substantially identical inserts joined by a lead frame including the removable lead frame portion.

12. An antenna tape and reel package comprising:
a plurality of antennas, each antenna formed by injection molding one metal insert of a tape of substantially identical metal inserts in a plastic insert sized to position the metal insert a predetermined distance from a ground plane when the antenna is assembled with a printed circuit board; and
indexing apparatus for moving the plurality of antennas through an automated printed circuit board assembly system.

13. The antenna tape and reel package of claim 12 wherein the indexing apparatus comprises indexing holes formed in the tape.

14. An antenna manufacturing method comprising:
positioning a metal insert in a mold cavity; and
filling the mold cavity with plastic to form a plastic spacer shaped for positioning the metal insert a predetermined distance from a ground plane of a printed circuit board (PCB) when the plastic spacer is mounted to the PCB.

15. The antenna manufacturing method of claim 14 wherein positioning the metal insert in the cavity comprises pressing the metal insert against a wall forming one side of the cavity.

16. The antenna manufacturing method of claim 14 wherein positioning the metal insert in the cavity comprises:

filling a portion of the mold cavity with plastic to form a first plastic wall; and pressing the metal insert against the first plastic wall before filling the remainder of the mold cavity with plastic.

17. The antenna manufacturing method of claim 14 wherein positioning the metal insert in a mold cavity comprises positioning one metal insert of a set of substantially identical joined metal inserts in a mold cavity of a set of substantially identical mold cavities and wherein filling the mold cavity with plastic comprises each of the set of mold cavities with the plastic.

18. The antenna manufacturing method of claim 17 further comprising:

separating the metal inserts of the set of metal inserts to form individual antennas.

* * * * *